US012566753B1

(12) United States Patent
Harold

(10) Patent No.: US 12,566,753 B1
(45) Date of Patent: Mar. 3, 2026

(54) RESILIENT GPS COMPATIBLE TIMING FOR DISTRIBUTED LEDGER

(71) Applicant: GoKnown LLC, Shreveport, LA (US)

(72) Inventor: Michael D. Harold, Shreveport, LA (US)

(73) Assignee: GoKnown LLC, Shreveport, LA (US)

( * ) Notice: Subject to any disclaimer, the term of this patent is extended or adjusted under 35 U.S.C. 154(b) by 0 days.

(21) Appl. No.: 18/801,557

(22) Filed: Aug. 12, 2024

Related U.S. Application Data

(63) Continuation-in-part of application No. 18/425,812, filed on Jan. 29, 2024, now Pat. No. 12,062,043, which is a continuation-in-part of application No. 17/897,901, filed on Aug. 29, 2022, now Pat. No. 11,886,463, which is a continuation-in-part of application No. 17/537,125, filed on Nov. 29, 2021, now Pat. No. 11,477,022, which is a continuation-in-part of application No. 16/993,038, filed on Aug. 13, 2020, now Pat. No. 11,188,523.

(60) Provisional application No. 62/888,011, filed on Aug. 16, 2019.

(51) Int. Cl.
*G06F 16/23* (2019.01)

(52) U.S. Cl.
CPC .................................. *G06F 16/2379* (2019.01)

(58) Field of Classification Search
None
See application file for complete search history.

(56) References Cited

U.S. PATENT DOCUMENTS

| | | | |
|---|---|---|---|
| 10,623,173 B1 | 4/2020 | Geng et al. | |
| 2019/0026146 A1 | 1/2019 | Peffers et al. | |
| 2019/0208422 A1 | 7/2019 | Haleem et al. | |
| 2020/0019626 A1* | 1/2020 | Todd ..................... | H04L 9/3239 |
| 2020/0186607 A1 | 6/2020 | Murphy et al. | |
| 2020/0328886 A1 | 10/2020 | Newton et al. | |
| 2021/0019429 A1 | 1/2021 | Cooner | |
| 2021/0399820 A1* | 12/2021 | Hoptroff ............... | H04J 3/0655 |

* cited by examiner

*Primary Examiner* — Eddy Cheung
(74) *Attorney, Agent, or Firm* — St. Onge Steward Johnston & Reens LLC; Stephen P. McNamara

(57) ABSTRACT

A system, method and apparatus in which a client computer initiates and communicates a distributed ledger transaction, said transaction labeled with a Coordinated Universal Time or UTC timestamp derived from GPS and/or GNSS satellite signals or, in the absence of GPS, an alternate source of UTC signals. The distributed ledger network nodes are able to send and receive UTC time signals even if there is a GPS and/or GNSS satellite failure.

20 Claims, 4 Drawing Sheets

RESILIENT GPS COMPATIBLE TIMING FOR DISTRIBUTED LEDGER

FIELD OF THE INVENTION

The present invention relates generally to methods for electronically receiving and transmitting distributed ledger transactions and messages between and among a multiplicity of computing nodes in a distributed ledger network.

BACKGROUND OF THE INVENTION

In an increasingly globalized economy in which digital data transactions of every type are required to traverse both public and private networks of individuals, corporations, national boundaries and continents at speeds and volumes that continue to increase year over year by orders of magnitude, distributed ledgers and their associated blockchain technologies have emerged as a preferred solution. In 2008, Satoshi Nakamoto published the Bitcoin White Paper which described a decentralized, distributed, peer-to-peer, public network of nodes able to provide secure, anonymous, automated payment services between two parties. On Jan. 3, 2009, the bitcoin network became operational when Satoshi Nakamoto mined the genesis (i.e., first) block of bitcoin. One of the key features of the system was and remains the ability to incentivize operators of the nodes by providing them a means to acquire bitcoin currency by being the first to mine (i.e., process) transactions in groups or "blocks" of transactions. Each group of transactions and each transaction within each block is linked together using a one-way cryptographic function that converts plain text to a unique fixed-length text message called a hash. Since there is no way to reverse the hash process to recover the original text, these hashes are used to immutably link all of the transactions processed by the distributed ledger beginning with the first transaction. In the case of bitcoin, because the hashing process is computationally intensive, block mining normally consists of solving a hashing problem of predetermined complexity in order to receive credit for mining the next block in the chain. This procedure is commonly referred to as Proof-of-Work or PoW. The creation of a new block requires the approval of other nodes on the network, each of which has a complete and identical copy of the blockchain/ledger record beginning with the first transaction and continuing to the most recent block. This voting approval process makes it difficult to alter completed transactions without the alteration being discovered by the other nodes, greatly increasing the security of the system and the integrity of its data. The largest barrier to increasing the performance of this transaction processing method is the computationally intensive nature of the block mining process which results in a slower operation of the system than would be possible without block mining.

To increase the speed and volume of transaction processing, the concept of Proof-of-Stake has replaced Proof-of-Work. Proof-of-Stake or PoS uses a lottery system as opposed to a PoW brute force computational problem to choose the blockchain node that will mine the next block. In the case of both PoW and Pos, since transactions are completed in blocks of multiple transactions and since no new group of transactions can be considered completed until the most recent block is recorded, each block in the ledger is and remains essentially a "tick" of the blockchain clock. This "tick" of the blockchain clock is an implicit yet distinct function, separate and apart in purpose from the operator incentive which is block mining. Since the original bitcoin ledger was implemented in 2009, new distributed ledger and blockchain architectures have proliferated. The majority of distributed ledger implementations to date have continued to provide similar incentives for block mining. From a transaction processing point of view, block mining is a batch process. This has proven a major impediment to increasing the speed and transactional throughput of blockchain technology. What is needed to replace this batch process is a means of processing individual transactions in time order at scale across the network. Such an approach to distributed ledger transaction processing is much faster, provides higher throughput and more closely conforms to standard database processes, especially as they relate to concurrency control as a means of ensuring both transactional and data integrity.

None of the presently known methods of distributed ledger transaction processing, however, are able to provide highly secure and scalable transactions while at the same time providing all of the important key features of the underlying blockchain technology which include immutability, decentralization, consensus, security and automation. Specifically, the prior art fails to demonstrate any system or method in which a client device initiates and communicates a distributed ledger transaction, smart contract or data, hereinafter referred to collectively as "transaction", to an individual node in a network of distributed ledger nodes or to the network itself, which transaction is labeled with a high precision timestamp which is able to accurately preserve its time order and first-in, first-out (i.e., FIFO) position across all nodes in the network, each of which nodes may also receive and process incoming transactions in like manner. Additionally, the prior art fails to describe a cryptographically linked series of transactions that derive their time order from Universal Coordinated Time or UTC signatures obtained from the GPS and/or the GNSS satellite constellations, or, in the absence of a GPS signal, from an alternative source or sources of UTC time signatures. In particular, because of the need for high precision timestamps to process large volumes of transactions, messages and control signals individually and in time order over a decentralized network, the use of a global, standardized source of time signals is required. The preferred source for these time signals is Coordinated Universal Time or UTC time which is provided via radio signals by GPS and GNSS satellite constellations in Earth orbit. These time signals are used to synchronize clocks and networks to GPS UTC time which is accurate to 30 nanoseconds, 95% of the time. It is the accuracy and ubiquity of these GPS time signals that makes possible the synchronization and orchestration of global infrastructure that includes communication, finance, transportation, manufacturing, energy distribution, healthcare, emergency services and national defense among others.

Should the existing satellite GPS system fail, whether through unforeseen circumstances or direct military attack, without an alternative source of GPS signals, these global infrastructures would immediately degrade in performance and catastrophically fail soon after.

None of the presently known methods of distributed ledger transaction processing, however, are able to provide highly secure and scalable transactions while at the same time providing all of the important key features of the present invention's underlying blockchain technologies which include immutability, decentralization, guaranteed high precision time accuracy, time-ordered transaction execution, time-ordered Byzantine Fault Tolerant voting consensus, security and automation. Specifically, the prior art fails to demonstrate any system or method in which a client device initiates and communicates a distributed ledger transaction, smart contract or data, hereinafter referred to collectively as "transaction", to an individual node in a network of distributed ledger nodes or to the network itself, which transaction is labeled with a UTC timestamp derived from a GPS signal in order to preserve its time order and first-in, first-out (i.e., FIFO) position across all nodes in the network, each of which nodes may also receive and process incoming transactions in like manner.

Additionally, the prior art fails to describe the encryption of said transaction using a quantum event generated random binary key. Furthermore, no prior art implements these features using a combination of wireline and wireless communications as a means of placing the distributed ledger network nodes in close proximity to the client device and transaction, thereby minimizing the time and distance between the client and ledger node network. Finally, no prior art implements these features as an alternative method for providing high precision, UTC equivalent GPS timestamps for purposes of time synchronization among all nodes in the network and the provision of those timing signals and accompanying timestamps to the distributed network's client devices.

There is, therefore, a present need to provide an improved paradigm for the provision of alternate and resilient UTC time signals that overcomes the aforementioned constraints.

SUMMARY OF THE INVENTION

A system, method and apparatus with which a client initiates and communicates a distributed ledger signal, message, command or other form of transaction to an individual node in a network of distributed ledger nodes or to the network itself, which transaction is first labeled with a timestamp and a cryptographic hash generated from the timestamp and the data record received before it is encrypted using quantum event generated random binary digits and then securely transmitted to the other ledger nodes in the network. This allows the highly secure and time ordered communication of all transactions and transaction-related messages to the system with minimal risk of collision or race conditions. In contrast to the traditional distributed ledger transaction processing model, the present invention permits the secure and rapid transfer of transactions among multiple distributed ledger nodes in a network.

To accomplish this, the present invention combines the time ordering of transactions as they are received in real or near-real time, the secure communications of those transactions between ledger nodes, the minimization of network latencies associated with each transaction and the minimization of server and network operating costs associated with each transaction. The present invention is accordingly designed for use as a hardware and software system, method and apparatus capable of transmitting and receiving high volumes of distributed ledger transactions in an automated, peer-to-peer, replicated and decentralized computing environment. Specifically, the decentralized computing environment has as one of its key features a guarantee of first in, first out FIFO transaction processing that removes the need for traditional block-based transaction processing. This is made possible through the use of a timestamp and a hash which is added to each new incoming transaction at the point at which it enters the network. This operation maintains the time order among all transactions being processed by all ledger nodes in the network. The time accuracy of each node on the network is maintained through the use of GPS UTC offset data, broadcast by GPS transmitters accurate to within 40 nanoseconds 95% percent of the time.

Another feature is the encryption of each transaction message between ledger nodes using a quantum event generated random binary number for use as a private encryption key, public encryption key, one-time pad (i.e., OTP) or nonce.

A further feature is the ability to use the present invention to create distributed ledger networks that receive data from blockchains, secure data stores, decentralized exchanges, or immutable, general purpose distributed databases.

Another feature is the ability of each node in the distributed ledger to send and receive GPS and/or GNSS signals for the purpose of maintaining UTC accurate time across the network in the absence or intermittent availability of satellite based GPS signals. To create maximum efficiencies in terms of size, weight, performance and cost (SWaP-C), each node shall include the following chip scale hardware components: a grandmaster clock or CSGM, an atomic clock or CSAC, a quantum random number generator or CSQRNG, a Byzantine Fault Tolerant consensus protocol on a chip or CSBFT, a CPU and memory, an artificial intelligence processor or CSAI and a network communication interface or NIC.

It is, accordingly, an object of the present invention to set forth an improved paradigm for distributed ledger transaction processing.

It is another object of the present invention to provide a system, method and apparatus able to maximize the speed and throughput of distributed ledger transactions and, specifically, to meet the performance requirements of GPS and/or GNSS signals and messages.

It is a further object of the present invention to maximize the performance and minimize the size, weight and cost of each hardware node in the network using chip scale hardware components.

It is a further object of the present invention to provide a system, method and apparatus by which transactions can be securely transmitted using multiple encryption methods that include public keys, private keys and nonces composed wholly or in part of quantum event based random binary digits.

It is a further object of the present invention to provide a system, method and apparatus able to create a distributed ledger computing network using both wireline and wireless communications in combination with chip scale hardware as a means of placing small form factor distributed ledger nodes with in both stationary and mobile devices on land, on water, in the air and in space, whether those devices operate autonomously or are in turn operated by humans.

It is another object of the present invention to provide multiple sources of GPS/UTC signals by creating distributed ledger networks composed of various stationary and mobile devices on land, on water, in the air and in space, each device equipped with a distributed ledger node having both a network interface controller and a wireless transceiver.

It is a further object of the present invention to provide a system, method and apparatus that is able to transmit transaction-related messages between ledger nodes in a distributed ledger network using the same systems and methods as those used to transmit the original signals, messages, transactions and other data.

BRIEF DESCRIPTION OF THE DRAWINGS

A more complete understanding of the system, method and apparatus of the present invention may be obtained by reference to the following Detailed Description when taken in conjunction with the accompanying Drawings.

DETAILED DESCRIPTION OF THE INVENTION

The disclosures of my U.S. Pat. Nos. 11,188,523; 11,477,022; 11,886,463; 9,830,467; 10,467,425; 11,106,814; 11,423,169; 8,620,207; 9,351,138; 10,728,296; and 12,062,043 are hereby incorporated by reference.

A system, method and apparatus in which a client computer initiates and communicates a distributed ledger transaction, said transaction labeled with a Coordinated Universal Time or UTC timestamp derived from GPS and/or GNSS satellite signals or, in the absence of GPS, an alternate source of UTC signals. The transaction data is processed in a first-in-first-out sequence based upon the time value associated with the transaction data. An apparatus created from chip-scale components is used in the construction of each node in the network. The components include a grandmaster clock, an atomic clock, a quantum random number generator, a Byzantine Fault Tolerant consensus protocol, a CPU and memory, an artificial intelligence processor and a network communications interface. In the event of GPS and/or GNSS satellite failures, the distributed ledger network nodes will be able to send and receive UTC time signals in the absence of satellite GPS communications.

A system, method and apparatus in which a client computer initiates and communicates a distributed ledger transaction, said transaction labeled with a Coordinated Universal Time or UTC timestamp derived from GPS and/or GNSS satellite signals or, in the absence of GPS, an alternate source of UTC signals. The transaction data is processed in a first-in-first-out sequence based upon the time value associated with the transaction data. An apparatus created from chip-scale components is used in the construction of each node in the network. The components include a grandmaster clock, an atomic clock, a quantum random number generator, a Byzantine Fault Tolerant consensus protocol, a CPU and memory, an artificial intelligence processor and a network communications interface. In the event of GPS and/or GNSS satellite failures, the distributed ledger network nodes will be able to send and receive UTC time signals in the absence of satellite GPS communications.

Figure 1:
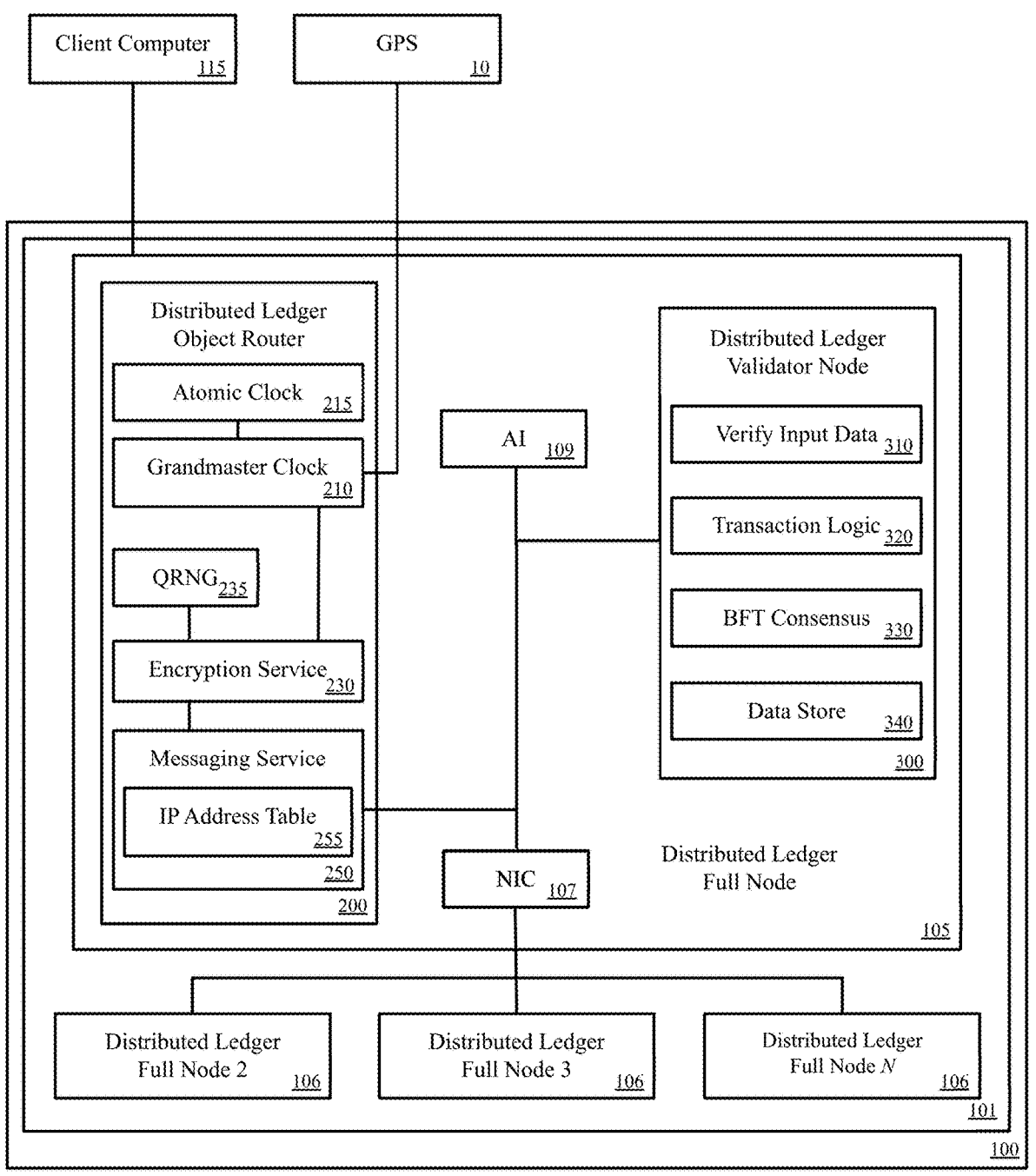
FIG. 1 illustrates the normal operation of the distributed ledger node in a distributed ledger network in the presence of a GPS signal.

With reference now to FIG. 1 of the Drawings, there is illustrated therein a distributed communications network, generally designated by the reference numeral 100. A client device 115 is attached to the network 100, which client device 115 may take the form of one of a variety of devices, including a desktop, laptop, tablet, smartphone, circuit board, or any other personal computing wireline or wireless computing device or, alternatively, a virtual or physical server computer located on-site, in a data center, in a 5G edge cloud or other private or public cloud, or an embedded computer contained in any stationary or mobile device, whether the device is human controlled or autonomous in its operation, that has as part of its function the ability to initiate and/or participate in multi-party transactions over the network, communicates directly with a distributed ledger full node 105, itself a part of the distributed ledger network 101.

As shown in the figure, said client device 115, initiates a transaction with a distributed ledger object router 200 contained within a full node 105, the full node contained within the distributed ledger network 101, the distributed ledger network 101 itself accessed through the network 100 containing the client device 115. In the present example, the distributed ledger object router 200 communicates directly with its associated distributed ledger validator node 300 and all of the other object routers contained in the full nodes 106 within the distributed ledger network 101. All communications entering or leaving the full node 105 are communicated through a network interface controller 107 capable of both wireline and wireless communications, including GPS wireless carrier frequencies L1 at 1575.42 MHz, L2 at 1227-6 MHz and L5 at 1176 MHz for both civilian (i.e., C/A) and military (i.e., P/Y) codes, with one or more client devices 115 and the other full nodes 106 in the distributed ledger network 101. Additionally, all events, messages and other data associated with a full node 105,106, whether occurring internally or as a result of communications with other full nodes 106 in the network are received and analyzed by an artificial intelligence or AI device 109 able to respond in real time to discrepancies or other aberrations in the operation of the full node 105 and the distributed ledger network 101 of which it is a part. The artificial intelligence device 109 also helps to maintain the operational efficiency and cybersecurity of the full node 105 and the larger distributed ledger network 101 in which it operates.

A distributed ledger validator node 300 is distinct from other types of distributed ledger nodes in that it is the only type of node able to participate in consensus voting. A distributed ledger validator node 300 is responsible for verifying, voting on and maintaining an immutable record of all transactions validated by the distributed ledger. This requires that all distributed ledger object routers 200 and distributed ledger validator nodes 300 in the distributed ledger network 101 must use the same type of device or devices and method or methods to process transactions. The distributed ledger object router 200 first timestamps the transaction using a nanosecond scale time stamp accurate to 40 nanoseconds 95% of the time, said time precision maintained through the use of GPS UTC offset data which is broadcast by GPS transmitters having the same time accuracy. The nanosecond scale timestamp is provided by a grandmaster clock 210 having a GPS Disciplined Oscillator (GPSDO) able to maintain its accuracy using signals received from one or more GPS satellites 10. The term "GPS" as used in the specification and claims in this application is defined as any geospatial positioning system (including the combined use of multiple geospatial positioning systems) such as GNSS, especially the US GPS system and other government sponsored systems such as GLO-NASS (Russia), Galileo (EU), Beidou (China), as well as commercially launched systems such as Iridium, SpaceX, or other future systems. Each grandmaster clock 210 in each distributed ledger object router 200 operates in the same manner. Preferred embodiments include a physical GPS transceiver locked to Universal Coordinated Time able to receive GPS signals from the GPS satellite(s) and to provide nanosecond time scale timestamps which conform in their accuracy to GPS time signals. The use of a 40 nanosecond scale timestamp allows a high volume of transactions to be processed asynchronously by each ledger node 300 in the network in a time order that is identical across all ledger nodes while at the same time minimizing potential collisions and race conditions. The accuracy of the grandmaster clock 210 is further enabled through the addition of an atomic clock 215. The continuous frequency syntonization of the grandmaster clock 210 and the atomic clock 215 enables the entrainment of their phases and frequencies, increasing the accuracy of the time signal and the stability of the signal over time. The long term stability of the atomic clock's 215 periodic oscillation, when coupled with the grandmaster clocks's 210 oscillation and time services, maintains the time accuracy of the node. Following the addition of the timestamp to the transaction, the transaction is encrypted by an encryption service 230 that uses, as part of its operation, a physical quantum random number generator or QRNG 235 to create public encryption keys, private encryption keys, one time key pads and nonces in any combination that meets the entropy and other security requirements defined by standards that include, but are not limited to, AIS31 PTG.3. Following the encryption of the transaction data, a messaging service 250 communicates the transaction data to its associated validator node 300 and to other distributed ledger object routers 200 on the network 100, one of which object router 200 is contained in each full node 105,106. The messaging service 250 relies upon a private IP address table 255 to identify other nodes in the distributed ledger network 101. To conform with GPS signal code requirements, carrier signals, PRN codes and navigation data are also used to identify nodes in the network and to communicate each node's position and time. As part of their transaction processing workflow, each ledger node 300 receiving the transaction processes the transaction as follows: It first verifies the input data 310. If the verification is successful, the node executes the transaction logic 320 associated with the transaction. Following the execution of the transaction logic, the ledger node 300 votes to either confirm or deny the transaction 330. If the verification of the input data 310 or the execution of the transaction logic 320 does not meet the requirements for a successful vote, the vote result is "NO". Otherwise, the vote result is "YES". The vote result is transmitted to that ledger node's 300 object router 200 where it is communicated via the messaging service 250 to the other ledger nodes in the network. Once the number of "YES" votes reaches the consensus majority vote threshold (ex. 51% or higher) for approval of the transaction, the transaction is added to each ledger node's persistent data store 340 as part of the immutable record of all transactions maintained separately by all full nodes 105 in the network.

The benefits of the precision provided by a timestamp accurate to 40 nanoseconds will be understood by those of ordinary skill in the art. By splitting each second into 25 million independent timestamp values, the ability to time order all events occurring within and between every full node in the distributed ledger network becomes possible. The combination of 40 nanosecond time signatures with an AI 109 able to identify and respond to any unusual behavior in the network guarantees a high level of performance, operational stability and cybersecurity.

Figure 2A:
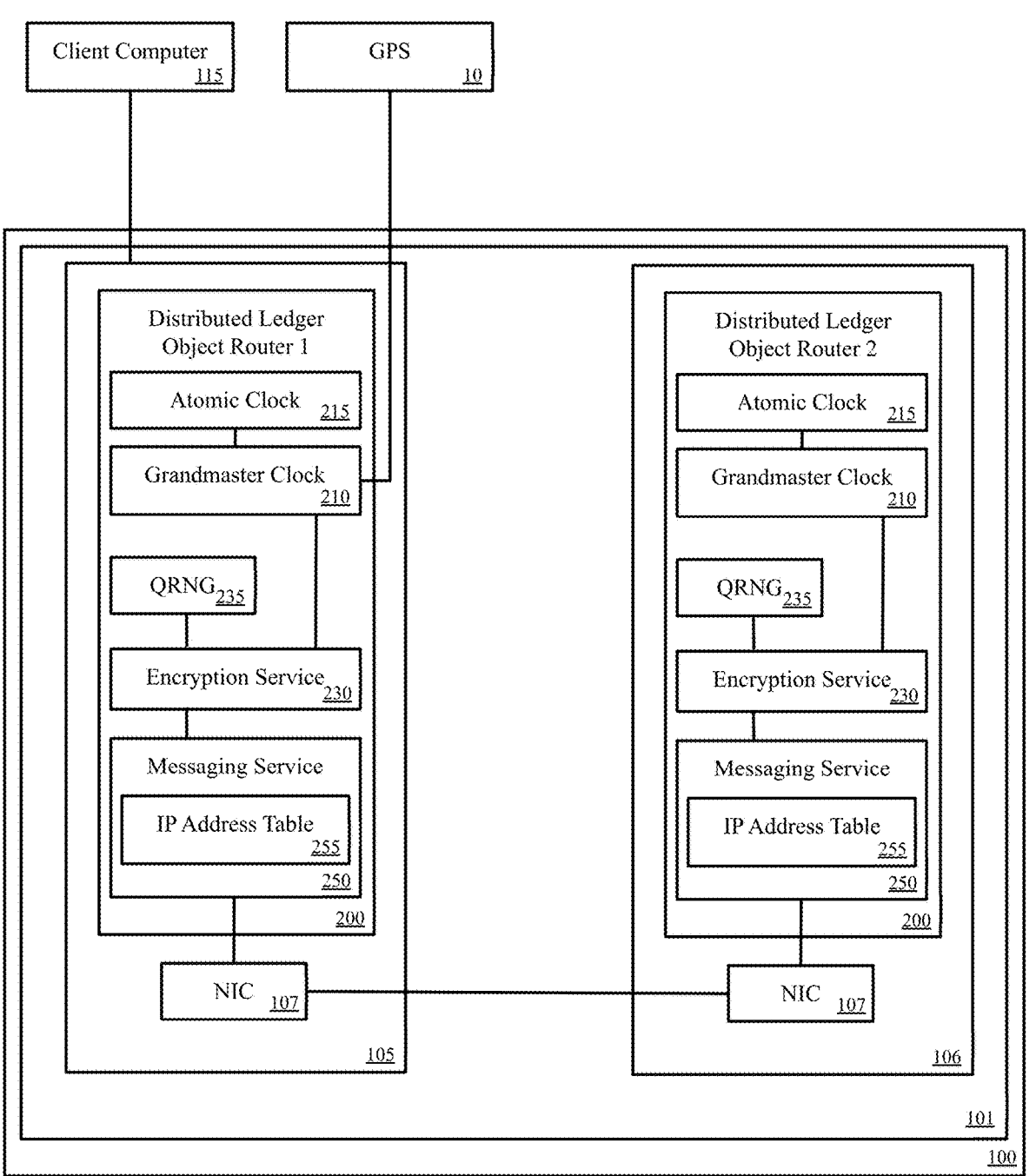
FIG. 2A illustrates the interoperation of the grandmaster clock and the atomic clock to provide GPS UTC signals in absence of satellite based GPS for one or more, but not all nodes in a distributed ledger for resilient GPS UTC time signals.

With reference now to FIG. 2A of the drawings, there is illustrated the interoperation of a node's 105 grandmaster clock 210 with the grandmaster clock 210 of a second node 106 as a result of the partial failure of satellite based GPS 10 on the part of the second node 106. Although many nodes may be contained in a given distributed ledger network, FIG. 2A shows the interactions between a node receiving satellite based GPS signals 105 and a node that is not receiving satellite based GPS signals 106, with the understanding that the same or similar process would apply to a distributed ledger network 101 containing three, four or many nodes in which multiple GPS signal failures could occur.

As shown in the figure, a GPS signal is received by a distributed ledger object router 200 contained within a full node 105, the full node contained within the distributed ledger network 101. All communications entering or leaving the full node 105 are communicated through a network interface controller 107 capable of both wireline and wireless communications, including GPS wireless carrier frequencies and signal codes (i.e., L1 at 1575.42 MHz, L2 at 1227-6 MHz and L5 at 1176 MHz for both civilian (i.e., C/A) and military (i.e., P/Y) codes), with one or more client devices 115 and the other full nodes 106 in the distributed ledger network 101. GPS related communication will occur using wireline and/or wireless communication cross-links between the object router nodes 105,106 in the network. The use of cross links combined with GPS standardized codes allows all nodes in the network 200,105,106 to share and synchronize their state using resilient, reliable GPS compatible data and timestamps This, in turn, enables the distributed ledger network to adapt to changing conditions with respect to location (i.e., terrestrial, water, air and space), environment and, in the case of militarily contested spaces, jamming and spoofing of GPS signals. When combined with a grandmaster clock computational logic that is able to maintain peer-to-peer communications with other grandmaster clocks in the network using a combination of wireline and wireless communications, a resilient, custom configurable GPS network based on specific mission requirements related to time precision, data type, size and volume, signal strength, signal frequency and a given location's geography, topology and environmental conditions can be rapidly deployed using the present invention's resilient GPS UTC distributed ledger 101.

Figure 2B:
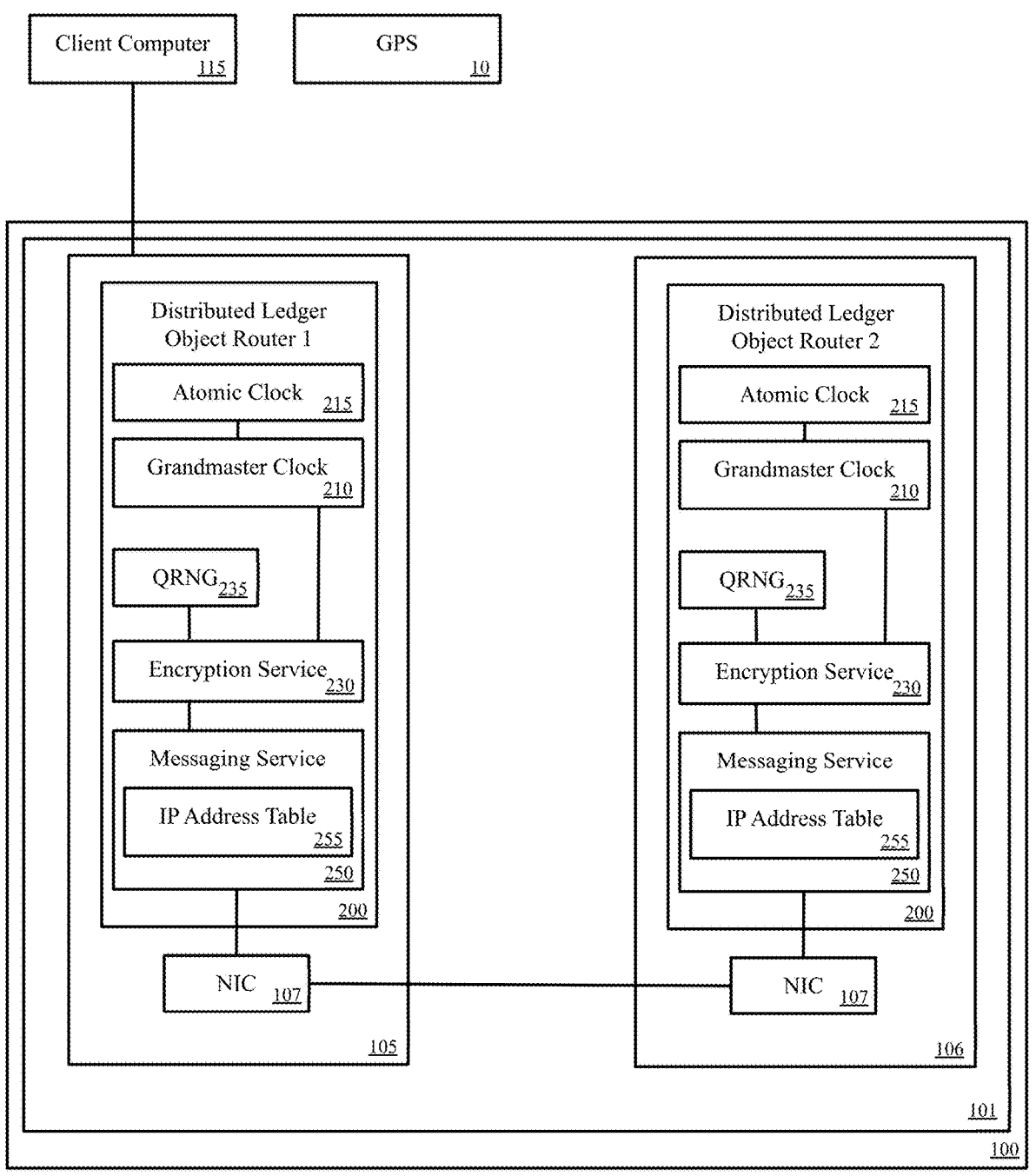
FIG. 2B illustrates the interoperation of the grandmaster clock and the atomic clock to provide GPS UTC signals in absence of satellite based GPS for all nodes in a distributed ledger for resilient GPS UTC time signals.

With reference now to FIG. 2B of the drawings, there is illustrated the interoperation of a node's grandmaster clock 210 and atomic clock 215 with other nodes' grandmaster clocks 210 and their corresponding atomic clocks 215 in the absence of satellite based GPS 10. In the event that no Earth orbit GPS satellite signal is available to any of the nodes on the distributed ledger network 101, each node 105,106 in the distributed ledger network 101 will immediately establish cross-link communications with every other node. These cross-link communications enable all nodes 105,106 in the network 101 to precisely synchronize their time and position signals with each other, to syntonize their grandmaster clock 210 and atomic clock 215 oscillators and thereby continue to provide accurate GPS and UTC data for an extended period of time depending on the frequency stability of the grandmaster clock 210 oscillators in combination with frequency stability of the atomic clock 215 oscillators of all nodes 105,106, etc. in the network 101. All hardware and software in each node 105,106 must be identical for all nodes 105,106 in the network 101.

Figures 3A, 3B, 3C, 3D:
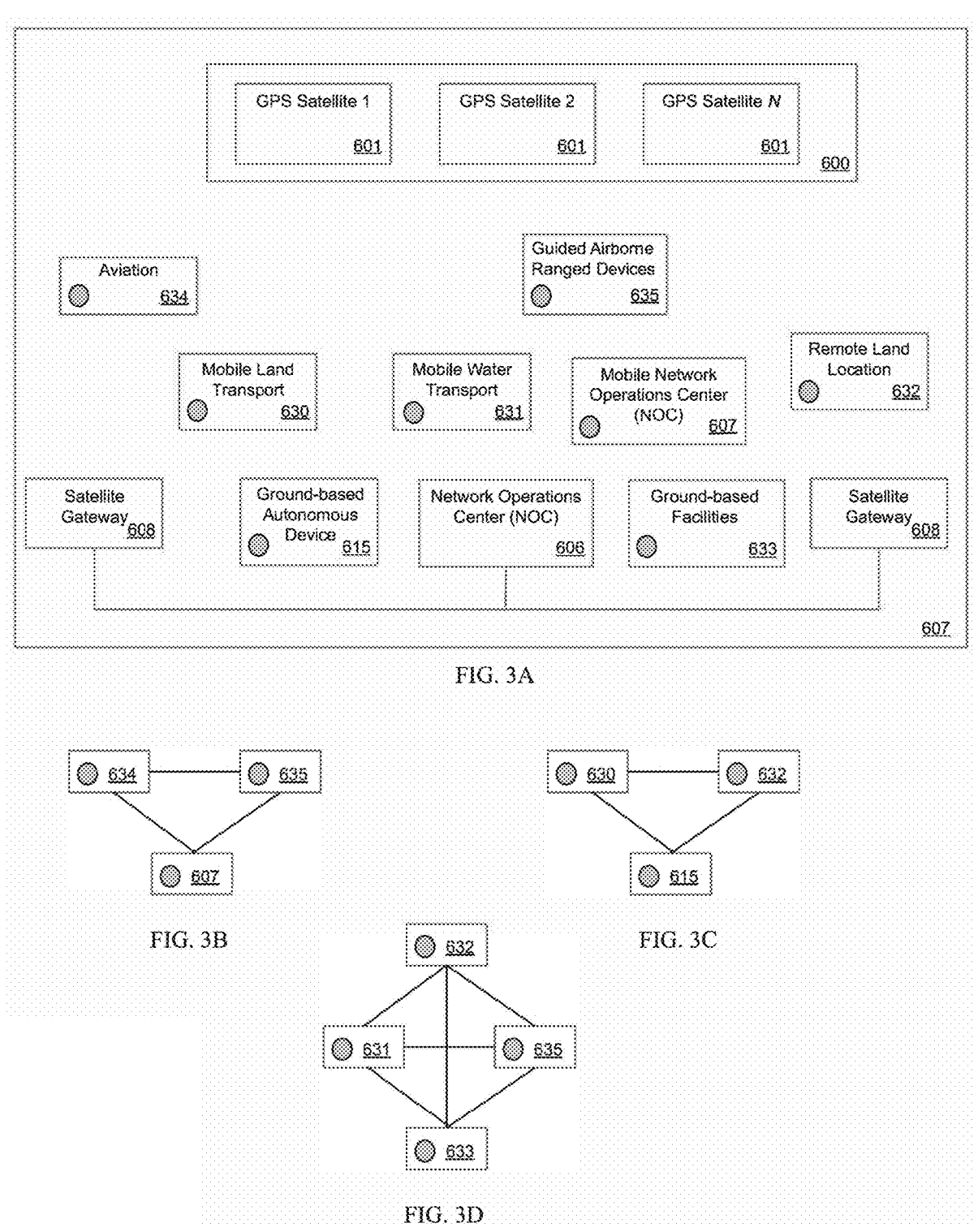
FIG. 3A illustrates the loss of reliability in GPS UTC dependent devices and environments in the absence of satellite based GPS UTC.
FIG. 3B illustrates the use of multiple nodes in a distributed ledger network to provide resilient GPS UTC and intercommunication between one or more aviation devices, one or more guided airborne ranged devices and one or more mobile network operations centers.
FIG. 3C illustrates the use of multiple nodes in a distributed ledger network to provide resilient GPS UTC for one or more mobile land transport devices, one or more remote land locations and one or more ground-based autonomous devices.
FIG. 3D illustrates the use of multiple nodes in a distributed ledger network to provide resilient GPS UTC for one or more remote land locations, one or more mobile water transport devices, one or more guided airborne ranged devices and one or more ground-based facilities

With reference now to FIG. 3A of the drawings, there is illustrated the operation of multiple GPS compatible, autonomous timing networks in the absence of GPS satellite signals. For purposes of explanation and not by way of limitation, the total operational space 607 contains a GPS satellite constellation 600 in which none of the satellites 601 is able to transmit GPS UTC data via radio signals. As a result, the network operations center or NOC 606 is not able to send and receive signals through the satellite gateways 608 whose purpose is to transmit data and other communications between the NOC 606 and all other devices in the operational space 607 via the GPS satellite constellation 600. This compromises the reliability of all devices that require continuous GPS UTC data for their operation. For purposes of explanation, those boxes containing a grey circle denoting the presence of one or more devices of the type described in the box, each device containing a distributed ledger node 105, each node 105 being a member of a distributed ledger network 101.

FIG. 3B illustrates the use of multiple nodes in a distributed ledger network to provide resilient GPS UTC and other intercommunications between one or more aviation devices 634, one or more guided airborne ranged devices 635 and one or more mobile network operations centers or NOCs 607.

FIG. 3C illustrates the use of multiple nodes in a distributed ledger network to provide resilient GPS UTC for one or more mobile land transport devices 630, one or more remote land locations 632 and one or more ground-based autonomous devices 615.

FIG. 3D illustrates the use of multiple nodes in a distributed ledger network to provide resilient GPS UTC for one or more remote land locations 632, one or more mobile water transport devices 631, one or more guided airborne ranged devices 635 and one or more ground-based facilities 633.

The foregoing figures provide examples of the ways in which the distributed ledger for resilient GPS UTC time signals may to used to create multiple GPS UTC networks for both commercial and military applications.

What is claimed is:

1. A method for processing distributed ledger transactions comprising the steps of:

receiving GPS signal data at a first distributed ledger object router within a full node;

generating GPS timestamp data for the received GPS signal data, the GPS timestamp data identifying a GPS time when the GPS signal data was received;

associating the GPS timestamp data with the GPS signal data;

receiving grandmaster clock time at the first distributed ledger object router;

generating grandmaster clock timestamp data for the received GPS signal data, the grandmaster clock timestamp data identifying a grandmaster clock time when the GPS signal data was received;

associating the grandmaster clock timestamp data with the GPS signal data;

transmitting the GPS signal data and associated GPS timestamp data and grandmaster clock timestamp data from the first distributed ledger object router to a first distributed ledger validator node via a validator messaging service;

the first distributed ledger validator node receiving the GPS signal data and associated GPS timestamp data and grandmaster clock timestamp data at the first distributed ledger validator node and validating a time determination;

transmitting the GPS signal data and first distributed ledger validator node time determination validation to a second distributed ledger object router;

transmitting the GPS signal data and first distributed ledger validator node time determination validation from the second distributed ledger object router to a second distributed ledger validator node via a validator messaging service; and obtaining a consensus on the validity of the first distributed ledger validator node time determination validation from validity determinations received from the second distributed ledger validator node and additional distributed ledger validator nodes.

2. The method of claim 1, wherein:

the first distributed ledger object router receives GPS signal data and the grandmaster clock of the first distributed ledger object router generates a timestamp data for the received GPS signal data, the grandmaster clock timestamp data identifying a time when the GPS signal data was received;

associating the grandmaster clock timestamp data with the GPS signal data;

encrypting the GPS signal data and the associated grandmaster clock timestamp data with first distributed ledger object router identifying information;

transmitting the GPS signal data and the associated grandmaster clock timestamp data with first distributed ledger object router identifying information from the first distributed ledger object router to the first distributed ledger validator node via a validator messaging service;

the distributed ledger validator node receiving the GPS signal data and the associated grandmaster clock timestamp data with first distributed ledger object router identifying information and unencrypting the GPS code signal data and the associated grandmaster clock timestamp data with first distributed ledger object router identifying information;

the first distributed ledger validator node determining the validity of the GPS signal data; and transmitting the GPS signal data and first distributed ledger validator node determination of the validity of the GPS signal data to the second distributed ledger object router.

3. The method of claim 1, wherein one or more of the distributed ledger object routers are provided in a device which is a ground-based smartphone, satphone, satphone-enabled smartphone, personal computing device, or a server computer containing a distributed ledger node.

4. The method of claim 1, wherein one or more of the distributed ledger object routers are provided in a mobile land transport, mobile water transport, aviation, or guided airborne ranged device containing a distributed ledger node.

5. The method of claim 1, wherein the grandmaster clock timestamp data has an accuracy of 40 nanoseconds or less.

6. The method of claim 1, further comprising: adding the GPS signal data and the first distributed ledger validator node time determination validation to an immutable persistent data store of a first distributed ledger if the consensus is a positive consensus.

7. The method of claim 1, further comprising:

when a distributed ledger object router is unable to receive GPS signal data, the distributed ledger object router synchronizes its grandmaster clock time to a consensus time determined from the consensus on the validity of the first distributed ledger validator node time determination validation.

8. A method for processing distributed ledger transactions comprising the steps of:

receiving GPS signal data at a first distributed ledger object router within a full node;

a grandmaster clock of the first distributed ledger object router generating a grandmaster clock timestamp data for the received GPS signal data, the grandmaster clock timestamp data identifying a time when the GPS signal data was received;

associating the grandmaster clock timestamp data with the GPS signal data;

transmitting the GPS signal data and associated grandmaster clock timestamp data, from the first distributed ledger object router to a distributed ledger validator node via a validator messaging service;

the distributed ledger validator node receiving the GPS signal data and associated grandmaster clock timestamp data at the distributed ledger validator node and determining the validity of the GPS signal data;

transmitting the GPS signal data and distributed ledger validator node determination of the validity of the GPS signal data to the second distributed ledger object router; and obtaining a consensus on the validity of the GPS signal data from the first and second distributed ledger validator nodes and additional distributed ledger validator nodes.

9. The method of claim 8, wherein first distributed ledger object router identifying information is associated with the timestamp data and the GPS signal data.

10. The method of claim 8, wherein one or more of the distributed ledger object routers are provided in a device which is a ground-based smartphone, satphone, satphone-enabled smartphone, personal computing device, or a server computer containing a distributed ledger node.

11. The method of claim 8, wherein one or more of the distributed ledger object routers are provided in a mobile land transport, mobile water transport, aviation, or guided airborne ranged device containing a distributed ledger node.

12. The method of claim 8, wherein the timestamp data has an accuracy of 40 nanoseconds or less.

13. The method of claim 8, further comprising: adding the GPS signal data and the consensus on the validity of the GPS signal data to an immutable persistent data store of a first distributed ledger if the consensus is a positive consensus.

14. The method of claim 8, further comprising:

when a distributed ledger object router is unable to receive GPS signal data, the distributed ledger object router synchronizes its grandmaster clock time to a consensus GPS time determined from the consensus on the validity of the GPS signal data.

15. A method for processing distributed ledger transactions comprising the steps of:

receiving GPS signal data at a first distributed ledger object router within a full node;

a grandmaster clock of the first distributed ledger object router generating a grandmaster clock timestamp data for the received GPS signal data, the grandmaster clock timestamp data identifying a time when the GPS signal data was received;

associating the grandmaster clock timestamp data with the GPS signal data;

encrypting the GPS signal data and the associated grandmaster clock timestamp data;

transmitting a GPS code including the encrypted GPS signal data and associated grandmaster clock timestamp data from the first distributed ledger object router to a distributed ledger validator node via a validator messaging service;

the distributed ledger validator node receiving the GPS code including the encrypted GPS signal data and associated grandmaster clock timestamp data at the distributed ledger validator node and unencrypting the GPS signal data and associated grandmaster clock timestamp data;

the distributed ledger validator node determining a validated time from the GPS signal data;

transmitting the GPS code and distributed ledger validator node validated time to a second distributed ledger object router; and obtaining a consensus on the validity of the validated time from the first and second distributed ledger validator nodes and additional distributed ledger validator nodes.

16. The method of claim 15, wherein the grandmaster clock timestamp data has an accuracy of 40 nanoseconds or less.

17. The method of claim 15, wherein one or more of the distributed ledger object routers are provided in a device which is a ground-based smartphone, satphone, satphone-enabled smartphone, personal computing device, or a server computer containing a distributed ledger node.

18. The method of claim 15, wherein one or more of the distributed ledger object routers are provided in a mobile land transport, mobile water transport, aviation, or guided airborne ranged device containing a distributed ledger node.

19. The method of claim 15, further comprising: adding the GPS code and the validated time to an immutable persistent data store of a first distributed ledger if the consensus is a positive consensus.

20. The method of claim 15, further comprising:

when a distributed ledger object router is unable to receive GPS signal data, the distributed ledger object router synchronizes its grandmaster clock time to a consensus validated time determined from the consensus on the validity of the validated time.

* * * * *